(12) United States Patent
Penner

(10) Patent No.: US 7,513,528 B2
(45) Date of Patent: Apr. 7, 2009

(54) VEHICLE GLOVE BOX DOOR INCORPORATING VARIATIONS IN RIB STRUCTURE FOR ADJUSTING IMPACT DEFORMATION PROXIMATE TO RESPECTIVE KNEE AND HAND HIT AREAS

(75) Inventor: Benjamin Warren Penner, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 380 days.

(21) Appl. No.: 11/349,459

(22) Filed: Feb. 7, 2006

(65) Prior Publication Data

US 2007/0182145 A1 Aug. 9, 2007

(51) Int. Cl.
*B60R 21/045* (2006.01)

(52) U.S. Cl. .................................. 280/752; 296/187.05

(58) Field of Classification Search ................. 280/751, 280/752; 296/37.12, 187.05, 70, 24.34, 37.8; 188/371, 377
See application file for complete search history.

(56) References Cited

U.S. PATENT DOCUMENTS

| 4,373,665 | A | | 2/1983 | Dietzsch ................ 237/12.3 A |
| 4,427,215 | A | | 1/1984 | Weichenrieder et al. ...... 280/752 |
| 4,662,649 | A | | 5/1987 | Ikeda et al. ................. 280/752 |
| 5,071,162 | A | | 12/1991 | Takagawa ................... 280/752 |
| 5,254,304 | A | * | 10/1993 | Adachi et al. ............. 264/328.1 |
| 5,326,130 | A | | 7/1994 | Gedeon et al. .............. 280/752 |
| 5,431,442 | A | | 7/1995 | Tomita et al. ............... 280/752 |
| 5,925,435 | A | | 7/1999 | Togawa et al. .............. 428/120 |
| 5,927,786 | A | | 7/1999 | Kawai et al. ................ 296/39.1 |
| 5,992,914 | A | * | 11/1999 | Gotoh et al. ................ 296/39.1 |
| 6,050,631 | A | * | 4/2000 | Suzuki et al. ........... 296/187.05 |
| 6,059,342 | A | | 5/2000 | Kawai et al. ................ 296/39.1 |
| 6,068,320 | A | | 5/2000 | Miyano ..................... 296/39.1 |
| 6,076,878 | A | * | 6/2000 | Isano ...................... 296/37.12 |
| 6,129,401 | A | * | 10/2000 | Neag et al. ................. 296/37.6 |
| 6,729,451 | B2 | * | 5/2004 | Yamagiwa .................. 188/377 |
| 6,783,156 | B2 | | 8/2004 | Chickmenahalli et al. ... 280/752 |
| 7,201,434 | B1 | * | 4/2007 | Michalak et al. ........ 296/187.05 |
| 7,311,328 | B2 | * | 12/2007 | Best et al. ................... 280/752 |
| 2002/0017805 | A1 | * | 2/2002 | Carroll et al. ............... 296/189 |
| 2003/0129418 | A1 | * | 7/2003 | Tamura ..................... 428/432 |
| 2003/0207077 | A1 | * | 11/2003 | Riha et al. .................. 428/120 |

(Continued)

FOREIGN PATENT DOCUMENTS

FR 285077 A1 * 7/2004

*Primary Examiner*—John Q. Nguyen
*Assistant Examiner*—Joseph Rocca
(74) *Attorney, Agent, or Firm*—Gifford, Krass, Sprinkle, Anderson & Citkowski, P.C.

(57) ABSTRACT

A glove box assembly exhibiting controlled deformation characteristics and including a three-dimensional and volume holding bin. A door includes an inner panel incorporating a variety of stiffening and supporting ribs projecting in a substantially grid-shaped fashion and along specified areas of the inner panel associated with an occupant knee impact zone. Additional uninterrupted surfaces are separated by the ribs and create softer hand impact zones. An outer panel substantially matches the inner panel in overall configuration and, upon being vibrationally welded to the inner panel along selected ribs, exhibits an exposed face defining the knee and hand impact zones when the glove box assembly is recess mounted within a vehicle dashboard.

12 Claims, 3 Drawing Sheets

U.S. PATENT DOCUMENTS

| | | | |
|---|---|---|---|
| 2004/0124623 A1 | 7/2004 | Yamazaki | 280/752 |
| 2004/0262937 A1* | 12/2004 | Peck et al. | 296/37.12 |
| 2005/0052011 A1* | 3/2005 | Best et al. | 280/752 |
| 2005/0116456 A1* | 6/2005 | Tajima et al. | 280/751 |
| 2006/0175858 A1* | 8/2006 | Pegorier et al. | 296/70 |
| 2007/0205624 A1* | 9/2007 | Zellner et al. | 296/37.12 |

* cited by examiner

VEHICLE GLOVE BOX DOOR INCORPORATING VARIATIONS IN RIB STRUCTURE FOR ADJUSTING IMPACT DEFORMATION PROXIMATE TO RESPECTIVE KNEE AND HAND HIT AREAS

BACKGROUND OF THE INVENTION

1. Field of the Invention

The present invention relates generally to a door incorporated into a vehicle glove box assembly. More specifically, the present invention discloses a two-piece vibrationally welded door associated with a glove box and which includes variations in rib structure associated with the inner panel, and in order to vary the deformation characteristics of the door proximate to both hand and knee hit zones associated with the passenger side of the vehicle.

In particular, the glove box door construction seeks to provide controlled deformation in response to contact by the passenger's knees, indicative of a collision. The reconfiguration and/or removal of ribs in outer side areas of the door facilitates easier "collapse" of the door in response to the passenger's hands contacting the same, this preventing the condition of arm "lock up" whereby a force spike is transferred from the passenger's arms to his or her chest area during a collision.

2. Description of the Prior Art

The prior art is well documented with examples of passenger restraint structures, including both those incorporated into a vehicle instrument panel/dashboard assembly, as well as its installed glove box. One objective in the design and construction of the vehicle dash and associated glove box is to facilitate deformation in response to an experienced forward impact, and in order to minimize as well as equalize the forces transferred to the vehicle's front seat passenger.

One example of a passenger restraint structure for an automotive vehicle is set forth in U.S. Pat. No. 5,431,442, issued to Tomita, and which teaches a glove box attached to a vehicle instrument panel so as to be opposed to the knees of the passenger. The glove box incorporates an intermediate wall connecting front and rear walls associated with the glove box. A stiffener member is located between the glove box and a part of the vehicle body and is stiffer than the glove box for crash energy generated between the passenger and the vehicle body in the running direction of the vehicle. Upon impact, the weaker intermediate wall of the glove box is compressed, deformed and broken, thereby absorbing the crash energy.

A further example selected from the prior art includes U.S. Pat. No. 6,783,156, issued to Chickmenahalli et al., and which teaches a passenger restraint including a knee bolster having receptacles for receiving knee blockers. The knee blockers further include multi-celled elements which absorb kinetic energy attributed to a forward impact/collision experienced by the vehicle.

U.S. Patent Application Publication No. 2004/0124623, to Yamazaki, teaches an occupant protection apparatus having a panel constituting a portion of a passenger compartment side surface of an instrument panel, and in order to move when at least a knee load of an occupant is inputted. A plurality of support members face transverse end portions of the panel and, respectively, and exhibit a rigidity higher than that of the panel and in order to absorb an impact load applied to the knees of an occupant who faces the instrument panel.

Finally, U.S. Pat. No. 5,326,130, issued to Gedeon et al., teaches a vehicle instrument panel structure extending transversely across a width of the vehicle interior forwardly of a vehicle occupant seat. The instrument panel structure includes an upstanding backing plate having a layer of foam material thereon covered by a decorative fascia. The backing plate is a unitary member formed of a plastic material. A pair of spaced apart elongated and horizontally extending box-like protuberances are provided on one portion of the lower section of the backing plate in the path of the occupant knee travel, and which may occur during sudden deceleration of the vehicle.

SUMMARY OF THE PRESENT INVENTION

The present invention discloses a two-piece vibrationally welded door associated with an outwardly pivoting glove box bin, secured within a vehicle dashboard along a passenger side of a vehicle. In particular, the present invention teaches the variations in rib structure associated with the inner panel of a two-piece and vibration welded door or face panel associated with a glove box assembly, the same being constructed in order to vary the deformation characteristics of the door, proximate to both hand and knee hit zones associated with the passenger side of the vehicle and in response to a collision experienced by a front seat passenger.

A particular objective of the present invention is in the design and construction of the glove box door in order to provide for controlled deformation in response to contact by the passenger's knees, indicative of a collision. The reconfiguration and/or removal of ribs in outer side areas of the door is also incorporated in order to facilitate easier inward "collapse" of the door, in response to the passenger's hands contacting the same, this intended to prevent the condition of arm "lock up" whereby a force spike is transferred from the passenger's arms to his or her chest area during a collision.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
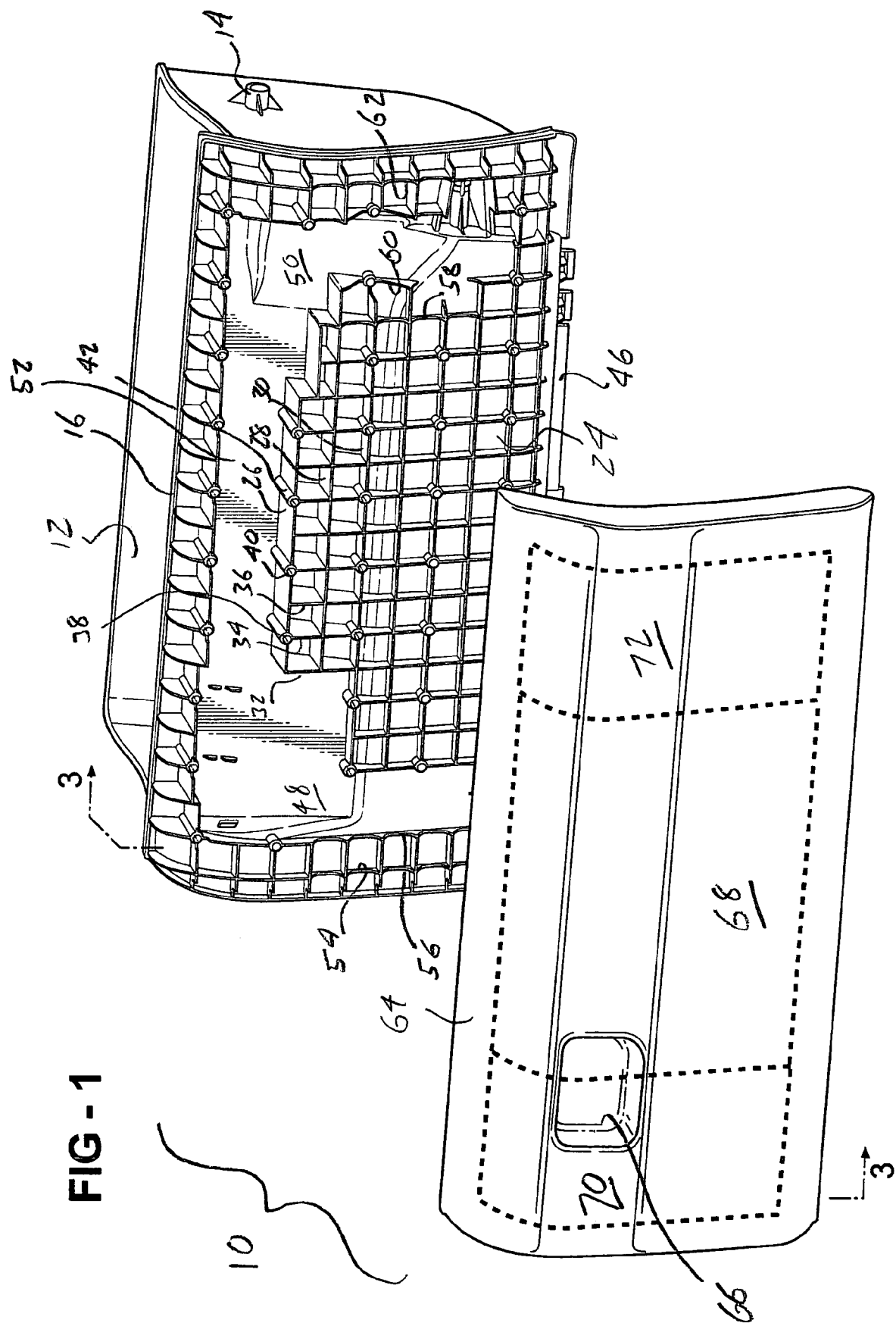
FIG. 1 is an exploded perspective view of the glove box assembly according to the present invention.
Figure 2:
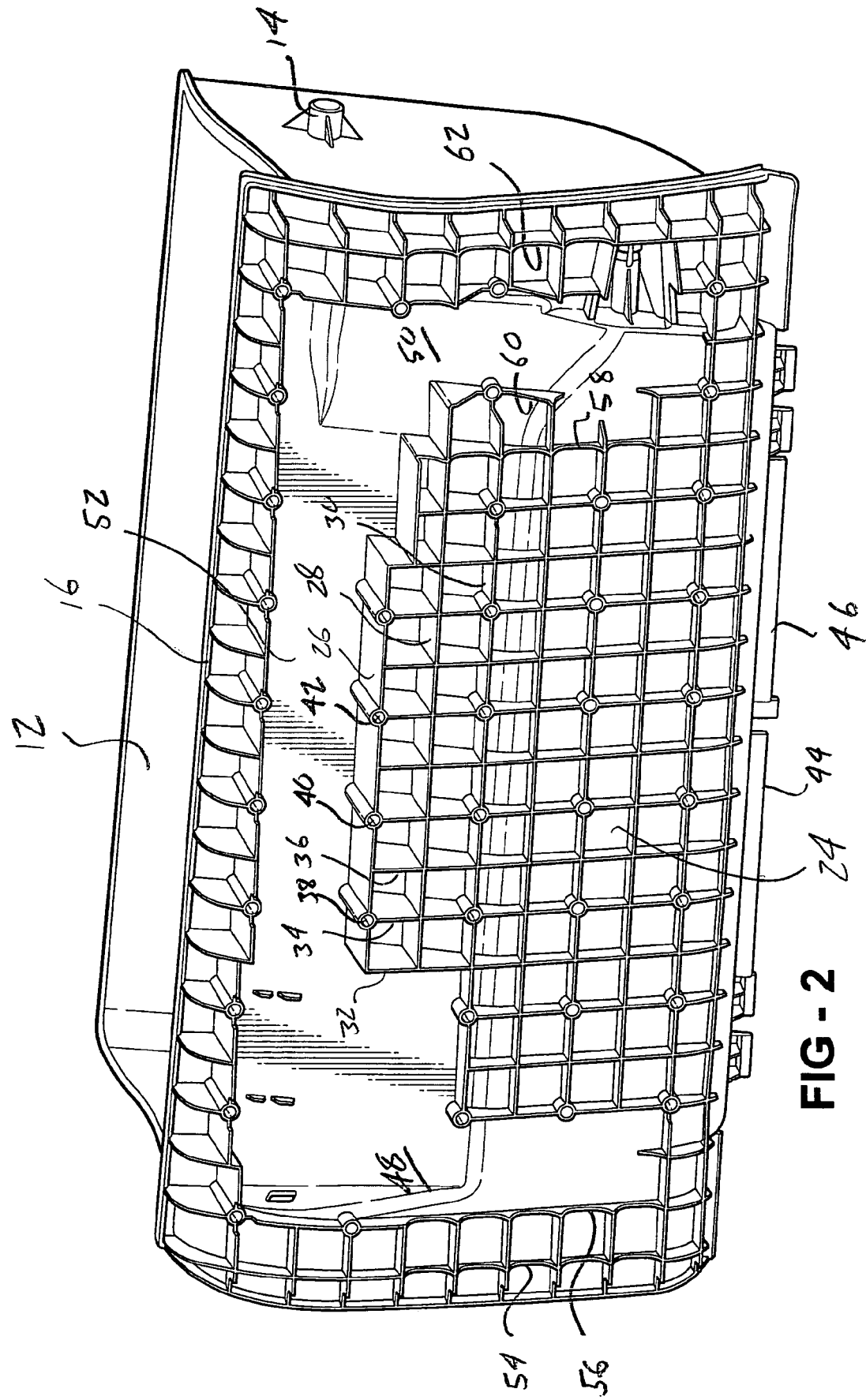
FIG. 2 is an enlarged perspective of the exposed inner panel associated with the glove box door shown in FIG. 1 and better illustrating both the overall arrangement and regionalized configurations of the stiffening rib structure for providing varied deformation characteristics proximate to both knee and hand impact locations.

Referring now to FIG. 1, a glove box assembly is generally referenced at 10 according to the present invention. The glove box assembly typically includes a three-dimensional, and typically three sided and open top volume holding bin 12 which is constructed of such as an injection molded plastic. The bin 12 may further include side projecting supports, see at 14 in FIGS. 1 and 2, and which establish stop locations upon engaging opposing locations of a vehicle dash structure, and upon the bin 12 being pivotally actuated outwardly from a recessed and latched arrangement within the dashboard to an exposed and opened location whereby the interior contents of the open bin 12 are accessible.

The deformable door according to the invention includes an inner panel 16 secured against locations associated with a forward edge of the bin 12. As with the bin 12, the inner panel 16 is typically constructed of a plasticized material formed in an injection molding process and such that the panel 16 exhibits a modified/arcuate planar configuration with a specified length, width and thickness, and generally corresponding to a dimensioned opening in the vehicle dashboard. A lower adjoining portion of the vehicle dash is illustrated at 18 in FIG. 3 and further includes an inwardly recessed edge 20 which seats a corresponding rear facing surface 22 of the bin 12 in the stored position.

An injection-molded construction used in creating the inner panel 16 is such that an exposed surface area 24 of the inner panel 16, opposite its points of connection to the forward edge of the bin 12, is exhibited by a grid-shaped array of horizontal, e.g. at 26, 28, 30, et seq., and interconnected vertical stiffening and supporting ribs, e.g. at 32, 34, 36, et seq. The interconnecting horizontal and vertical extending ribs are formed in a latticework pattern and at designated locations across the exposed surface area 24 of the inner panel 16 as will be described.

Selected web locations defining interconnecting points between horizontally and vertically extending ribs include ejector bosses, see at 38, 40, 42, et seq., these defining support and release locations for the injection molded inner panel 16 during its formation and removal from within a suitably configured mold. Additional hinge supports are defined, at 44 and 46, in extending fashion along a lower surface of the inner panel 16 and which, along with additional hinge support structure associated with the bin connection, are adapted to secure the glove box assembly 10 in pivoting fashion within the vehicle dashboard.

The arrangement, location thickness and construction of the support ribs is selected according to a number of varying considerations, among which are contemplated "crashworthiness" parameters associated with the engineered design of the inner panel 16. Along these lines, the horizontal and/or vertical ribs may be removed from certain areas associated with the inner panel 16 or alternatively, may be shaped or contoured to exhibit either more or less inward (crash) resisting support based upon the desired parameters of the design.

In particular, the inner panel surface area 24 of the inner panel 16, this generally defined collectively as the entire exposed surface area bounded by the four sides of the inner panel construction, includes a number of areas corresponding to either weakened or removed stiffening/supporting ribs. As illustrated in each of FIGS. 1 and 3, the exposed inner panel face 24 exhibits uninterrupted surfaces proximate first and second vertically extending and outermost sides, see at 48 and 50, and correspond to hand contact zones exerted against the welded door.

The exposed inner panel face further exhibits an upper horizontally extending and uninterrupted surface, see further at 52, interconnecting the first 48 and second 50 side surfaces. As best viewed from either FIG. 1 or 2, the grid-shaped stiffening and supporting ribs project generally along each of the four outermost sides, as well as along the lower and centermost portions of the inner panel surface area 24, with the exception of the interconnected and uninterrupted smooth surfaces defining areas 48, 50 and 52. The upper and lower edges of the vertically extending ribs are further arcuate shaped in pattern, combined with the horizontal ribs being reduced in height at the outermost side connecting locations, these as will be subsequently discussed facilitating easier and seamless vibrating engagement of the outer panel.

The horizontal extending surface 52 acts to lend additional inward deformation or collapsing in response to the impact of the occupant's hands against the glove box door, while at the same time maintaining the stiffer, more controlled deformation of the middle/lower areas of the door which correspond generally to knee impact zones associated with occupant during a vehicle collision.

In addition, sub-pluralities of the stiffening/supporting ribs associated with the inner panel are structurally weakened, typically at locations proximate the softer, hand impacting side surfaces 48 and 50. These are best shown by vertically extending and weakened support ribs 54 and 56, outboard the soft hand impact zone 48, as well as additional weakened support ribs 58, 60, and 62 positioned in vertically extending fashion along both inboard and outboard the opposite soft hand impact zone 50.

In a preferred application, each of the support ribs 54, 56, 58, 60 and 62 exhibit arcuately recessed configurations extending vertically and between successively spaced and horizontally interconnecting support ribs. In this fashion, it is preferable to retain the uniform shaping of the horizontally extending ribs, and in order to retain the desired vibration weld strength, while at the same time retaining the soft inward deformation capabilities of the door proximate the side (hand) impact zones, and independently of the stiffer more controlled deformation properties of the knee contact zones.

Figure 3:
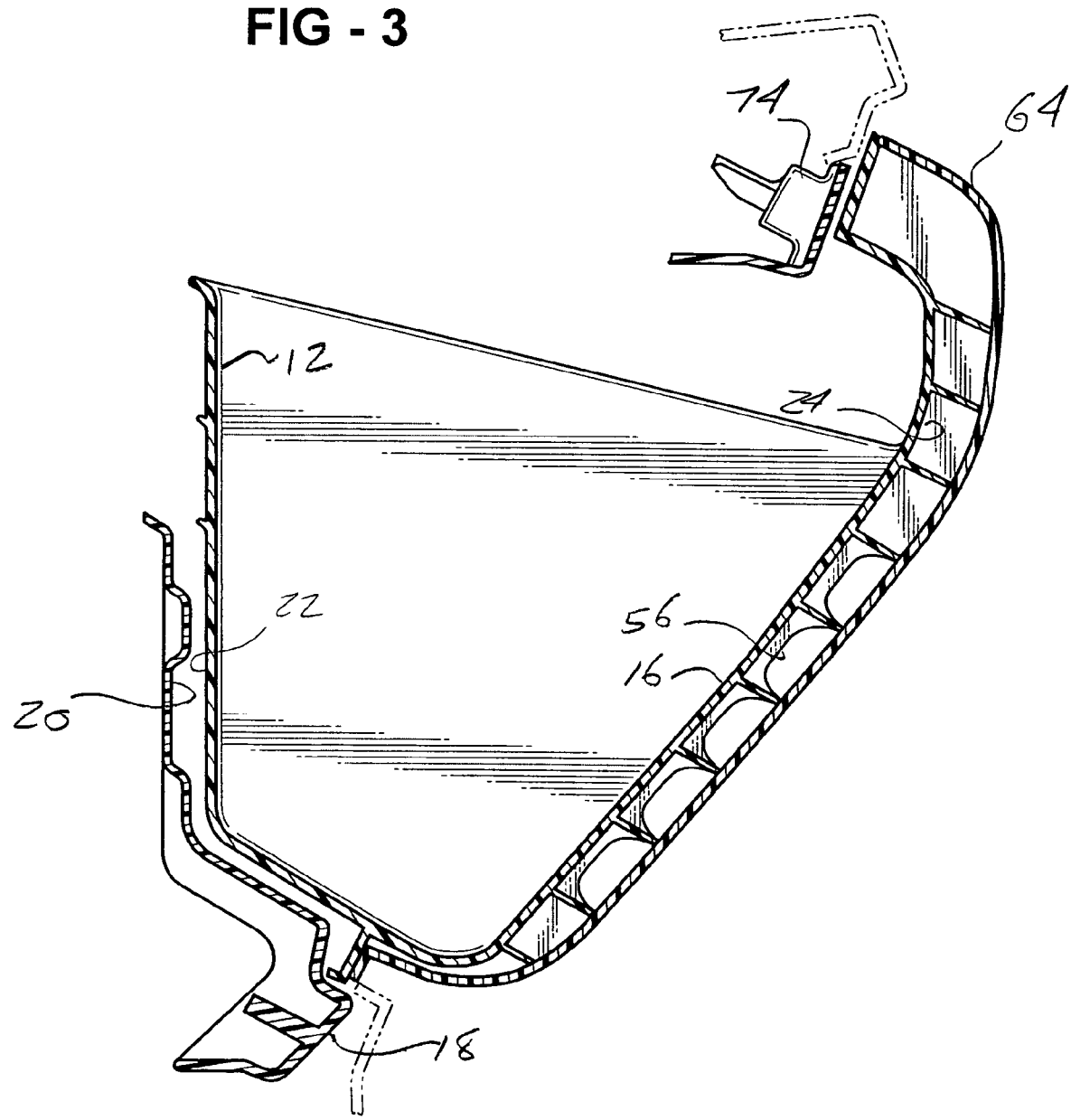
FIG. 3 is a side cutaway view taken along line 3-3 of FIG. 1 and showing the vibration welded nature established between the horizontally extending ribs associated with the inner panel and which are secured to corresponding locations associated with an opposing surface of the outer panel.

The glove box door further includes an outer panel 64, see again FIGS. 1 and 3, and which substantially matches the inner panel 16 in overall configuration. The outer panel 64 exhibits a substantially smooth outer surface with arcuately turned edges which overlap the sides of the inner panel 16, upon being vibration welded to the inner panel along the horizontal ribs contacting the inner surface of the outer panel 64, as well as additional to extra ribs extending inwardly from the outer panel 64 (not shown) in selected zones of the inner panel 16, and such as may further correspond to the region of a recessed handle engaging mechanism, see at 66 in FIG. 1.

The above, in cooperation, establishes a glove box door with an exposed face when said bin is mounted within the dashboard and which includes a main central knee impact zone 68 and side hand impact zones 70 and 72, as again referenced in relation to the outer panel 64 in FIG. 1. Referring again to FIG. 3, a top edge situated latch structure, see at 74, is associated with a corresponding upper location of the assembled door and, upon being actuated, permits the door to pivot outwardly and along the lower defined hinges 44 and 46.

In use, the glove box door design according to the present invention provides measured degrees of impact deformation in result to an occupant's hands and knees contacting the designated knee 68 and hand 70 and 72 impact zones. During certain seatbelt rated impact standards (such as referenced as "four star" or "five star" crash tests) it is desirable to reduce impact forces traveling to the occupant's chest and arms, such as resulting from the hands contacting stiffened/reinforced locations along the glove box door and the resultant "lock up" of the user's arms transferring significant forces to the chest and upper body.

By softening the "collapse" zones proximate to areas where the occupant's hands are most likely to impact the glove box door 10, these forces are reduced while at the same time substantially retaining the desired rigidity of the door structure in the knee impact zone. The stiffer aspect of the knee contact zone serves the further purpose of providing a desired and controlled rotational counterbalance to the counter forces exerted by an actuating passenger side airbag.

Having described my invention, other and additional preferred embodiments will become apparent to those skilled in the art to which it pertains, and without deviating from the scope of the appended claims.

I claim:

1. A vehicle dashboard mounted glove box exhibiting controlled deformation characteristics, comprising:

a three-dimensional and volume holding bin;

an inner panel secured to locations associated with said bin, said panel exhibiting an exposed face, a plurality of stiffening and supporting ribs projecting in substantially grid-shaped fashion along said exposed face and including a first sub-plurality of ribs and a second weakened sub-plurality of ribs; and an outer panel substantially matching said inner panel in overall configuration and, upon being welded to said inner panel along contact locations established between said support ribs and an inner surface of said outer panel, establishing a glove box door with an exposed face when said bin is mounted within the dashboard;

said first sub-plurality of ribs extending to contact said outer panel, said second sub-plurality of ribs having recesses opening toward said outer panel and not contacting said outer panel;

said recesses in said second sub-plurality support ribs causing varying deformation characteristics of said door, and proximate to respective hand and knee contact zones of an occupant impacting the door.

2. The glove box as described in claim 1, said exposed surface of said outer panel further comprising a recessed area against which is mounted a handle mechanism.

3. The glove box as described in claim 1, said inner panel further comprising hinge supports extending along a lower surface thereof and which are adapted to secure the glove box in pivoting fashion within the vehicle dashboard.

4. The glove box as described in claim 1, said bin further comprising at least one side projecting support adapted to contact the dash upon outward pivoting of the glove box and in order to define a fully opened condition.

5. The glove box as described in claim 1, each of said inner and outer panels having a specified shape and size and further comprising being vibration welded together along horizontal extending ribs drawn from said first sub-plurality of ribs and associated with said inner panel.

6. The glove box as described in claim 1, said exposed face of said inner panel further comprising at least one area corresponding to at least one of weakened and removed support ribs.

7. The glove box as described in claim 6, said exposed inner panel face further comprising an uninterrupted surface proximate first and second vertically extending sides, and corresponding to said hand contact zones exerted against the welded door.

8. The glove box as described in claim 7, said exposed inner panel face further comprising an upper horizontally extending and uninterrupted surface interconnecting said first and second side surfaces.

9. The glove box as described in claim 7, further comprising selected ribs drawn from said second sub-plurality of structurally weakened support ribs located proximate said extending side surfaces.

10. The glove box as described in claim 9, said weakened support ribs further comprising arcuately recessed configurations extending vertically and between successively spaced and horizontally interconnecting support ribs.

11. The reinforcing structure as described in claim 1, each of said bin, inner panel and outer panel having a specified shape and size and being constructed of a plasticized material in an injection molded process.

12. The glove box as described in claim 11, further comprising a plurality of ejector bosses configured within web locations along said inner panel interconnecting said grid-shaped support ribs.

\* \* \* \* \*